United States Patent [19]

Miller et al.

[11] Patent Number: 4,658,110
[45] Date of Patent: Apr. 14, 1987

[54] METHOD AND APPARATUS FOR WELDING

[75] Inventors: Jule A. Miller, Derby; Mary Bazan, Northford; Gerard E. Bessette, Hamden, all of Conn.

[73] Assignee: Avco Corporation, Stratford, Conn.

[21] Appl. No.: 605,936

[22] Filed: May 1, 1984

[51] Int. Cl.4 ............................................. B23K 26/00
[52] U.S. Cl. ........................ 219/121 LC; 219/121 LD; 219/121 EC; 219/121 FS
[58] Field of Search .............. 219/121 LC, 121 LD, 219/121 EC, 121 ED, 121 L, 121 LM, 121 LU, 121 LY, 121 FS

[56] References Cited

U.S. PATENT DOCUMENTS

| 3,437,785 | 4/1969 | Sciaky | 219/121 ED |
|---|---|---|---|
| 3,623,129 | 11/1971 | Miles | 219/121 ED |
| 4,263,496 | 4/1981 | Medlar | 219/121 ED |
| 4,461,947 | 7/1984 | Ward | 219/121 LC |

FOREIGN PATENT DOCUMENTS

| 0053384 | 3/1983 | Japan | 219/121 LD |
|---|---|---|---|
| 0047086 | 3/1984 | Japan | 219/121 LF |

OTHER PUBLICATIONS

H. R. Heidary, et al, Optics and Laser Technology, "Microprocessor-Controlled Laser Scanning System for Annealing of Semiconductors", vol. 13, No. 5, pp. 265-269, Oct. 1981.

Primary Examiner—C. L. Albritton
Attorney, Agent, or Firm—Ralph D. Gelling; M. E. Frederick

[57] ABSTRACT

A laser beam is used to weld two or more overlapping layers of metal together. The beam is applied through tubular clamping elements which engage and squeeze the metal layers to be welded. By inserting an inert gas within the tubular elements, an oxygen-free weld zone may be obtained. The laser beam is deflected to create a substantially spiral-shaped weld pattern.

13 Claims, 7 Drawing Figures

METHOD AND APPARATUS FOR WELDING

BACKGROUND OF THE INVENTION

1. Electric Resistance Welding

Welds of the type suggested in this application were generally accomplished by means of electric resistance-welding techniques. In these methods, electrodes are applied to the weld zone with pressure in order to compress the overlapping layers of metal in the weld zone. By applying electric power to the electrodes current flows across the joint through the overlapping metal layers. Since the resistance is high at the interface of the layers, welding temperatures may be achieved and a weld nugget is formed at the joint.

The weld therefore is interior to the layers and cannot be visually inspected. One example of a test which is used to inspect the integrity of the resistance-welded joint for quality control is the "peel" test. In this test, a sample of the workpiece is joined by a single spot utilizing the same procedures as applied in a production operation for a finished part. After welding, one side of the joined sample is clamped and the other is peeled off. The weld button may then be examined to determine the parameters of the fused zone. Although this information may then be applied to the production cycle, it is clear that an accurate correlation depends on the ability to accurately control and monitor the operation. Since this method of welding is used for large volume, repetitive, production work in which one machine can be set up to make thousands of similar joints, close control and monitoring of the conditions of the weld zone are not always possible. The operator is, therefore, required to take frequent samples and perform the destructive "peel" test.

The disadvantages of resistance-welding, apart from the difficulty of inspection and process control, are that it requires a high heat input which creates thermal distortions on the workpiece.

2. Laser Welding

Welding operations utilizing a laser beam as the energy source are becoming more prevalent in the production environment. A laser beam is an intense, highly coherent beam of monochromatic light which has been amplified many times. Since the beam is exceptionally intense, extremely narrow and highly coherent, it may be focussed to an image that is brighter than the original source. In this way it is possible to obtain a light source so intense it can fuse steel and other metals to form a weld. The beam may also be optically deflected for accurate placement of the weld zone. The use of inert gas shielding in the work zone will improve the quality of the weld.

Similar to electron beam techniques, laser welding provides deeper penetration and is very suitable for delicate work. It is also a rapid, precise and highly controllable process which creates exceptionally high quality welds. A laser welding process generally requires less heat input than resistance-welding with a reduction in distortion.

It is the purpose of this invention to provide a welding process utilizing a laser which is as simple and repeatable as a resistance-weld process and creates a high strength weld that may be easily inspected.

BRIEF SUMMARY OF THE INVENTION

A workpiece consisting of multiple layers of metal is welded together by means of a laser to form an integral assembly. The layers are compressed in the weld zone by the engagement of the workpiece between upper and lower clamping elements. The clamping elements are tubular in shape having an axial passage. The laser beam is applied to the workpiece through the axial passage of one of the tubular clamping elements. The axial passage of each clamping element is filled with inert gas to displace air and to provide an oxygen-free weld zone. By either deflecting the laser beam or moving the workpiece through a predetermined pattern, a substantially spiral-shaped weld pattern is produced. This movement is computer controlled so that the weld pattern is a composite of fused and uneffected material and extends completely through the metal layers of the workpiece.

DESCRIPTION OF THE DRAWING

The preferred embodiment is described in more detail below with reference to the attached drawing and in said drawing.

DESCRIPTION OF THE PREFERRED EMBODIMENT

The welding system of this invention is comprised of a laser beam generator 1, a pair of clamping elements 2 and 3, and means to create a spiral pattern 4.

Figure 1:
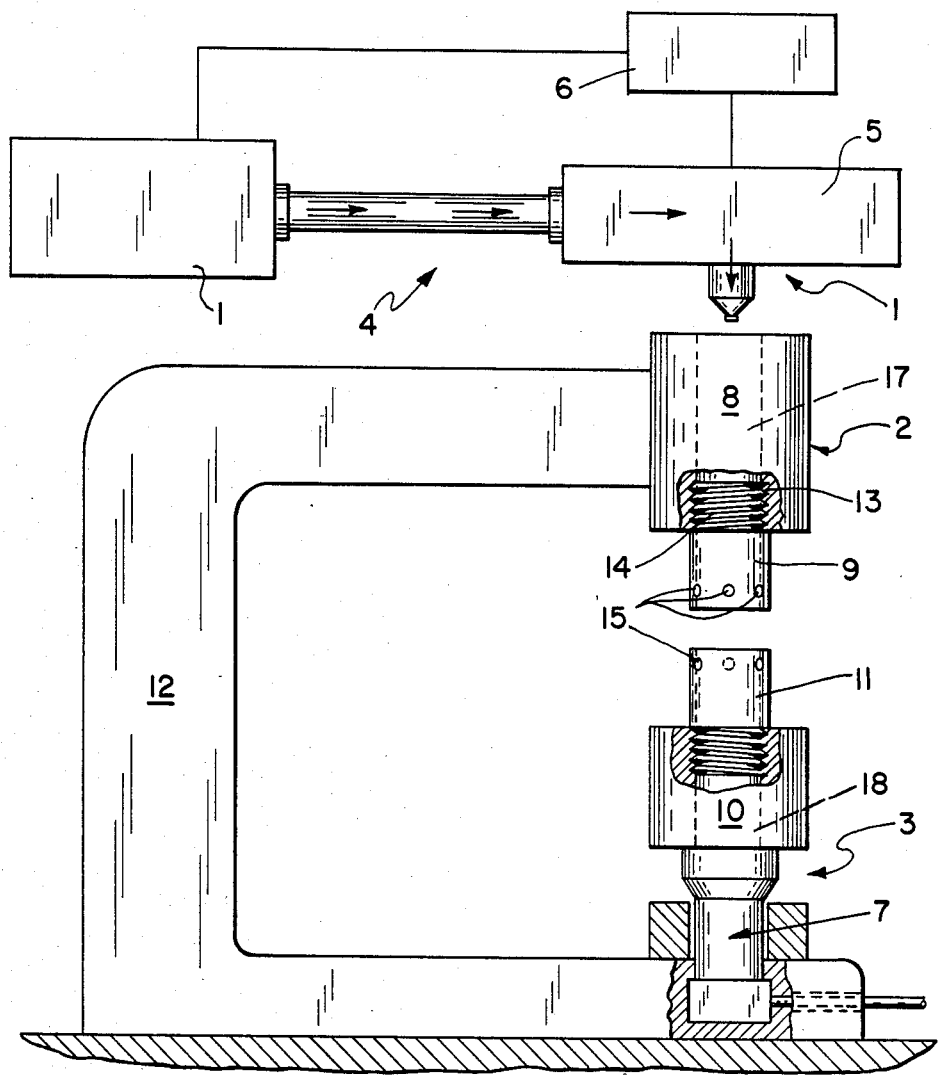
FIG. 1 is a schematic diagram of the laser welding system of this invention having a computer controlled optical deflection system.

In the preferred embodiment shown in FIG. 1, the laser beam generator 1 may be any commercially available unit, for example, a $CO_2$ laser which generates between 600 watts to 2000 watts continuously or up to 3000 watts in pulses.

In the system of FIG. 1, the pattern generating system consists of optical deflection means 5 which is controlled by computer 6. The computer 6 is programmed to move the beam in a substantially spiral pattern. This requires consideration of the linear speed of travel, the overall size of the pattern and the changing radius of the pattern. For ease in programming, it may be necessary to approximate the spiral pattern, for example, by using interconnected circular sections of increasing radius.

Figure 4:
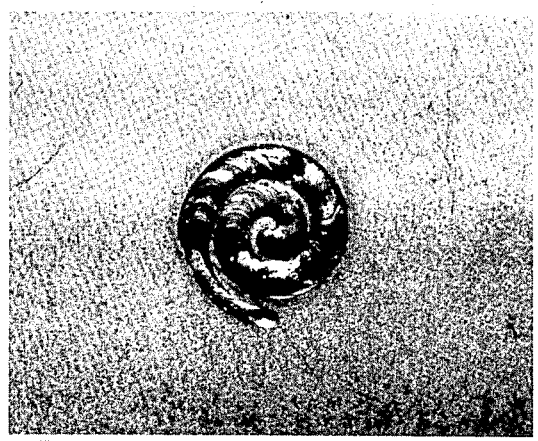
FIG. 4 is a top view of the substantially spiral-shaped weld pattern of the subject invention.

The ideal pattern, as approximated by the pattern shown in FIG. 4, is based on the archimedian spiral, the characteristics of which may be represented as follows.

$r$ = radius of spiral = a $\theta$ where $\theta$ = angle of spiral rotation and $$a = \text{constant} = \frac{r_{(2\pi)}}{2\pi} \text{ in which}$$

$r_{(2\pi)}$ = the radius of the spiral at $\theta = 2$

-continued

Since $S$ = linear travel speed which is kept constant and is approximately equal to $r\frac{d\theta}{dt}$ then $\frac{d\theta}{dt}$ is approximately equal to $S/r$ And the rate of angular rotation, $\frac{dr}{dt} = \frac{r(2\pi)}{2\pi} \times \frac{d\theta}{dt}$ This indicates that both the rate of angular rotation and the rate of increase in the radius are decreasing as the spiral unwinds. For example, if the final size of the weld pattern is to be 0.25 inches in diameter, and the distance between spiral arms is 0.040 inches, slightly more than three spiral revolutions can be used, as shown in FIG. 4. Linear travel speeds (S) of 50 to 200 inches per minute will be desirable.

Figure 5:
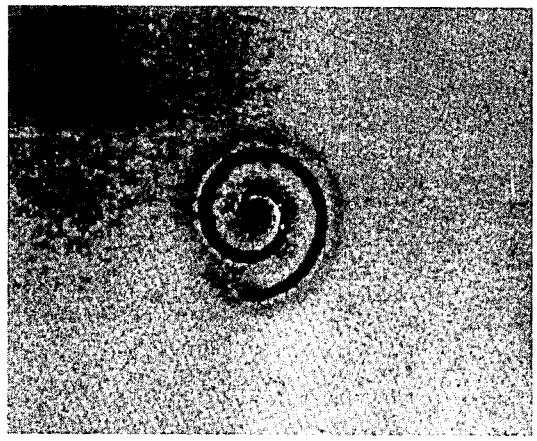
FIG. 5 is a bottom view of the substantially spiral-shaped weld pattern of this invention.

In order to maintain good weld characteristics and provide a weld that may be easily monitored by visual inspection, full penetration through the entire workpiece is desirable, as shown in FIG. 5. Clamping elements 2 and 3 are provided to compress the workpiece in the weld zone. As shown in FIG. 1, lower clamping element 3 is movable upward to engage the workpiece and force it against clamping element 2. The movement may be accomplished by a pneumatic or hydraulic ram 7 as is well-known in the field of resistance-welding. The ram 7 is secured to the support frame 12 and should be capable of supplying a force of 50 to 400 lbs. in the weld zone.

Figure 1A:
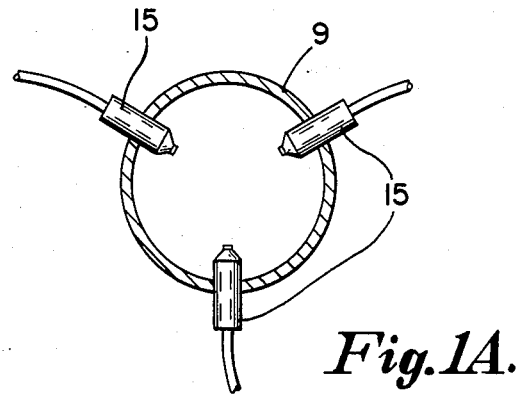
FIG. 1a is an endview of the tubular member showing the inert gas jets.

The clamping assembly consists of a pair of upper tubular members 8 and 9 and a pair of lower tubular members 10 and 11, each having axial passages 17 and 18. The outer members 8 and 10 of each pair are fixed to the rigid support frame 12 and the hydraulic ram 7 respectively and are constructed with internal threads 13. The inner tubular members 9 and 11 of each pair have external threads 14 which mate with the internal threads 13 of outer members 8 and 10. In this manner the tubular members 9 and 11 may be removably secured in the assembled position. As shown in FIG. 1a, fluid fittings 15 are attached to the inner members 9 and 11 to allow the supply of an inert gas, such as argon, to the weld zone.

As shown in FIG. 1, the laser beam generator 1 operates in conjunction with the upper clamping members 8 and 9 to enable the laser beam to be fired through the axial passage 18. This passage 18 must be large enough to allow deflection of the beam through the spiral pattern. The interface between lower tubular member 9 and the workpiece substantially defines the weld zone.

Figure 2:
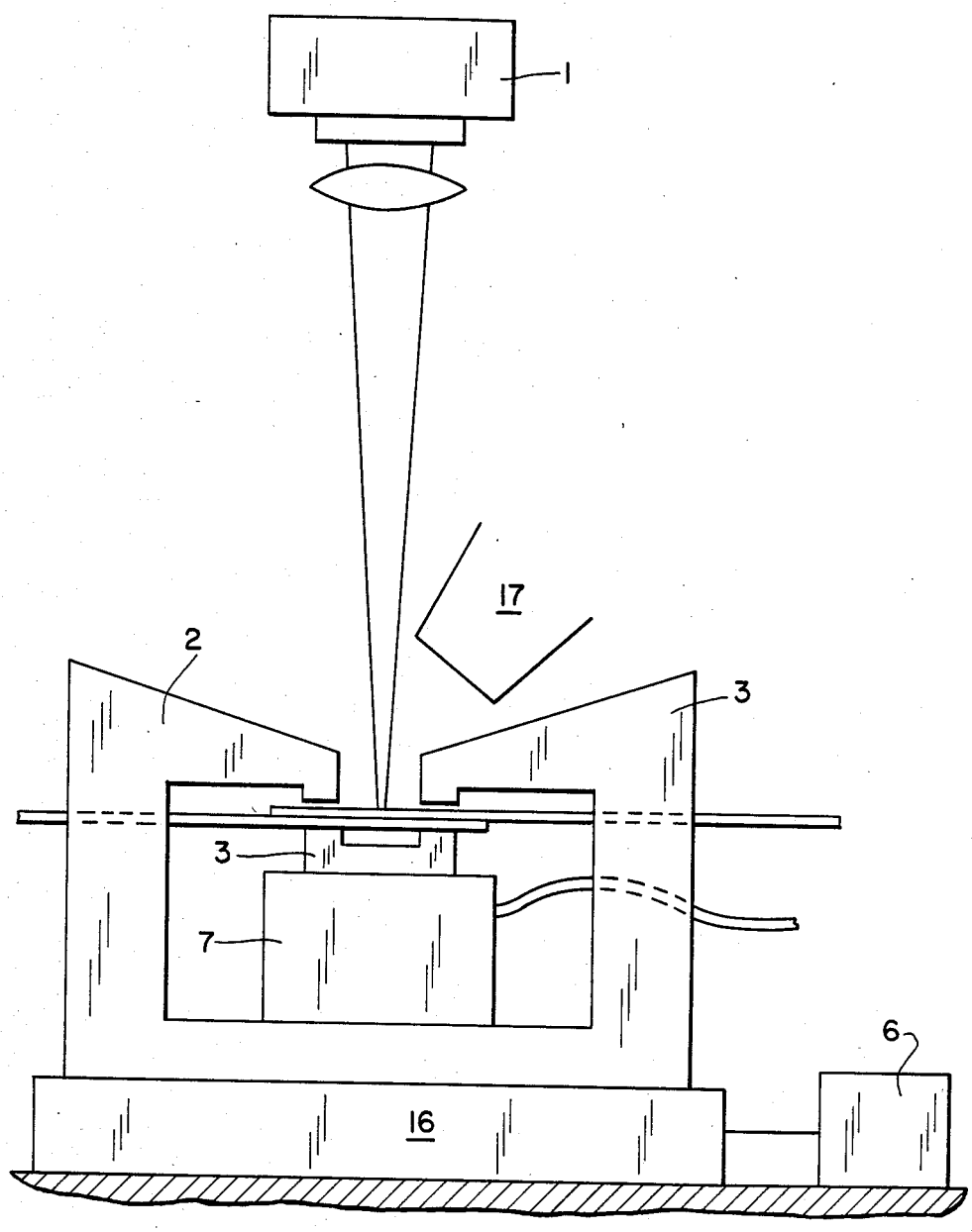
FIG. 2 is a schematic diagram of the laser welding system of this invention having the workpiece mounted on a computer controlled x-y table.
Figure 3:
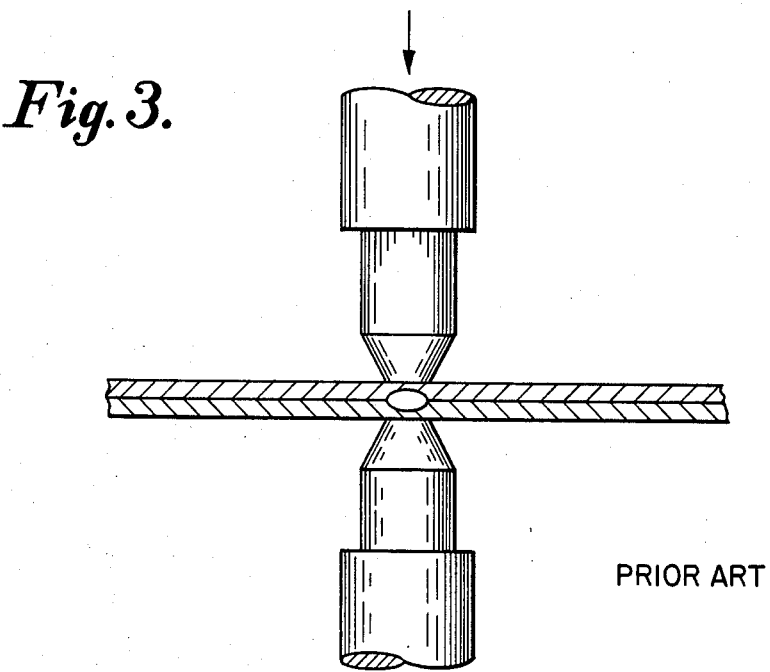
FIG. 3 shows the prior art electric resistance-welding technique.

In an alternate embodiment shown in FIG. 2, the laser beam generator 1 is held stationary and the workpiece is mounted and registered on an x-y table 16 by the clamping elements 2 and 3. The x-y table may be numerically controlled and programmed through computer 6 to move the workpiece under the laser beam in a substantially spiral pattern. A nozzle 17 is attached to a supply of inert gas and provides a substantially oxygen-free atmosphere in the weld zone.

By designing the machine to resemble traditional resistance-welding equipment and by utilizing pneumatic actuation of the clamping mechanism, coordinated with the computer controlled laser pattern generating system, the learning cycle for operators of the equipment will be substantially reduced and the process will be readily adaptable to any resistance-welding operation.

To operate the system of FIG. 1, the workpiece is first registered within the clamping elements 2 and 3 so that the weld zone is underneath the tubular clamping member 9 and the ram 7 is actuated to cause clamping elements 2 and 3 to exert a clamping force of approximately 50 to 400 lbs. in the weld zone. The laser 1 is then fired through the upper tubular assembly passage 18 with sufficient power to fully penetrate the workpiece at a specific linear rate of movement. The optical deflection system 5 is then actuated to move the laser beam at a constant linear speed through a spiral pattern. In order to avoid hot stop, crater cracks, the linear speed should be accelerated at the end of the pattern as shown in FIG. 4. During fusion of the workpiece material, an inert gas bath is applied to the weld zone through both upper and lower tubular members 9 and 11. After the clamping elements 2 and 3 are released, the workpiece is moved to the next weld zone.

Figure 6:
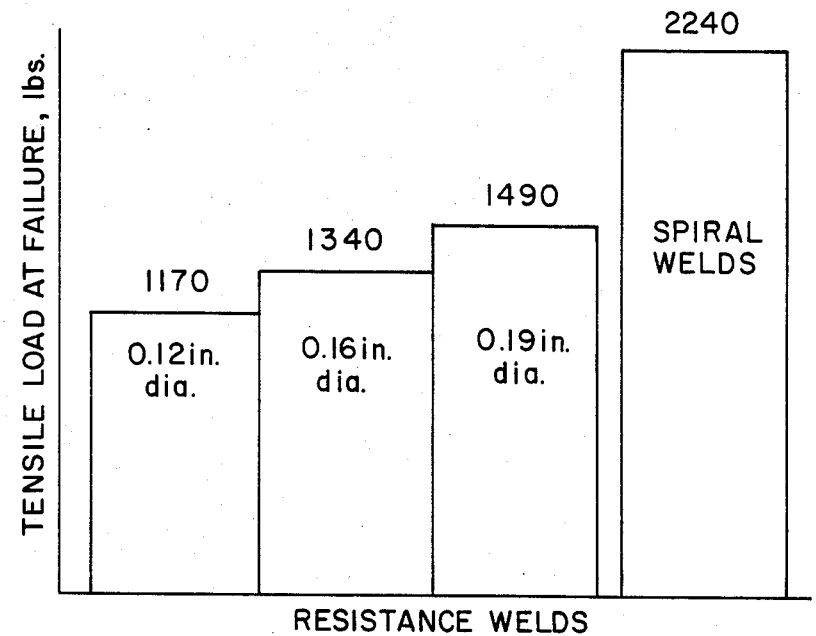
FIG. 6 is a chart showing the relative strengths of welds performed by prior art resistance-welding techniques and spiral pattern welds performed according the subject invention.

It has been found that by use of the spiral pattern, an increase of almost 50% in weld strength is achieved. This is accomplished with a reduction of about 80% in actual weld area and a significant decrease in total heat energy input. Although the use of a laser is anticipated, similar results can be obtained with an electron beam welder as shown in the chart of FIG. 6. Because the molten metal expulsion encountered in resistance-welding is eliminated, the parts of the workpiece need not be overlapped as much as required in resistance-welding; only an overlap sufficient to accommodate the spiral pattern need be present. In addition, an increase in the maximum ratio of the thicknesses of the parts of the workpiece is achieved to approximately 20:1 from the 3:1 limit present in resistance-welding.

Consistent with the preceding description but not limited thereby we claim:

1. Apparatus for spot welding a metal workpiece having first and second sides comprising clamping means for exerting a compressive force on the workpiece during the welding operation in the zone within which the weld is to be performed;

laser measn for generating a laser beam and applying said beam to the workpiece in the weld zone with sufficient power to fuse the workpiece and create a weld;

means to control the application of the beam to the workpiece to create a series of substantially arcuate segments defining a weld pattern, said means to control the application of the beam to the workpiece comprising an optical deflection system adapted to receive the laser beam and moveably direct the beam to the weld zone, and a computer controller operatively connected to the optical deflection system to move the beam to form a weld pattern comprising arcuate segments, and said computer controller is programmed to adjust the angular velocity of the beam to maintain a constant linear velocity throughout the weld pattern.

2. Apparatus for spot welding a metal workpiece having first and second sides as described in claim 1 wherein the power of the laser beam is sufficient to penetrate through the full depth of the workpiece.

3. Apparatus for spot welding a metal workpiece having first and second sides comprising clamping means for exerting a compressive force on the workpiece during the welding operation in the zone within which the weld is to be performed;

laser means for generating a laser beam and applying said beam to the workpiece in the weld zone with sufficient power to fuse the workpiece and create a weld;

means to control the application of the beam to the workpiece to create a series of substantially arcuate segments defining a weld pattern, said means to control the application of the beam to the workpiece comprising an optical deflection system adapted to receive the laser beam and moveably direct the beam to the weld zone, and a computer controller operatively connected to the optical deflection system to move the beam to form a weld pattern comprising a series of arcuate segments, said computer controller being programmed to adjust the angular velocity of the beam to maintain a constant linear velocity throughout the weld pattern, said clamping means comprising a supporting structure extending to either side of the workpiece;

a ram mounted on the supporting structure adjacent the second side of the workpiece and being operable to exert a force towards said workpiece;

a first tubular clamping element mounted on the supporting structure for engagement with said first side of said workpiece, said first clamping element having an axial passage extending therethrough passage to the laser beam for transmission through said passage to the workpiece; and a second tubular clamping element mounted on the ram to engage the second side of said workpiece and exert a compressive force on the workpiece in conjunction with the first clamping element, said first and second clamping elements comprising outer support tubes mounted to the support structure and the ram respectively and inner engaging tubes removably secured to the outer tubes and constructed to engage the workpiece.

4. Apparatus for spot welding a metal workpiece having first and second sides as described in claim 3 wherein said first clamping element has an axial passage extending through both inner and outer tubes and is mounted to receive the high energy beam for transmission through said passage to the workpiece.

5. Apparatus for spot welding a metal workpiece having first and second sides as described in claim 4 wherein said second clamping element has an axial passage extending at least through the inner tube and wherein both inner tubes are connected to a supply of inert gas.

6. A method of spot welding a metal workpiece within a predetermined weld zone comprising the steps of:

applying a coxpressive force on the workpiece in the weld zone;

generating a high energy beam having sufficient power to fuse the workpiece and create a weld;

applying the high energy beam to the workpiece within the weld zone; and moving the high energy beam through a substantially spiral-shaped pattern in the weld zone, the high energy beam being moved through the substantially spiral-shaped weld pattern at a speed that will create a uniform fusion of the metal workpiece which penetrates through the full depth of said workpiece throughout the entire pattern, the high energy beam being moved through the substantially spiral-shaped weld pattern at a constant linear speed, and the compressive force being applied to the workpiece by a pair of members having an annular cross-section thereby creating an annular area of compression which defines the weld zone.

7. A method of spot welding a metal workpiece within a predetermined weld zone as described in claim 6 wherein the high energy beam is applied through the merber of annular cross-section within the annular shaped weld zone.

8. A method of spot welding a metal workpiece within a predetermined weld zone as described in claim 6 further comprising the step of bathing the workpiece with inert gas within the weld zone.

9. Apparatus for spot welding a metal workpiece having first and second sizes comprising:

a supporting structure extending to either side of the workpiece;

a ram mounted on the supporting structure adjacent the second side of the workpiece and being operable to exert a force towards said workpiece;

a first tubular-shaped clamping element mounted on the supporting structure for engagement with said first side of said workpiece to form a closed weld zone, said first clamping element having an axial passage extending therethrough;

a second tubular-shaped clamping element mounted on the ram to engage the second side of said workpiece and exert a compressive force on the workpiece in conjunction with the first clamping element;

means mounted on the supporting structure for generating a laser beam and applying said beam through the axial passage of the first clamping element to the workpiece in the weld zone with sufficient power to fuse with the workpiece a create a weld; and means to control the application of the beam to the workpiece to create a predetermined weld pattern comprising a series of acruate weld segments, said means comprising an optical deflection system adapted to receive the laser beam and movably direct the beam through said predetermined weld pattern, said first and second clamping elements comprising outer supporting tubes mounted to the support structure and the ram respectively and inner engaging tubes removably secured to the outer tubes and constructed to engage the workpiece.

10. Apparatus for spot welding a metal workpiece having first and second sides as described in claim 9 wherein said second clamping element has an axial passage extending at least through the inner tube and wherein both inner tubes are connected to a supply of inert gas.

11. Apparatus for spot welding a metal workpiece having first and second sides as described in claim 9 wherein the predetermined weld pattern is shaped substantially as a spiral.

12. Apparatus for spot welding a metal workpiece having first and second sides as described in claim 11 wherein the computer controller is programmed to adjust the angular velocity of the beam to maintain a constant linear velocity throughout the spiral weld pattern.

13. Apparatus for spot welding a netal workpiece having first and second sides as described in claim 9 wherein the power of the high energy beam generating means is sufficient to penetrate through the full depth of the workpiece.

* * * * *